(12) United States Patent
Ideue et al.

(10) Patent No.: US 10,944,310 B2
(45) Date of Patent: Mar. 9, 2021

(54) ROTATING ELECTRIC MACHINE

(71) Applicant: TOYOTA JIDOSHA KABUSHIKI KAISHA, Toyota (JP)

(72) Inventors: Shigeki Ideue, Anjo (JP); Koji Kato, Anjo (JP); Keita Inda, Anjo (JP); Toshihiko Kamiya, Toyota (JP); Tatsuya Okishima, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 16/361,559

(22) Filed: Mar. 22, 2019

(65) Prior Publication Data
US 2019/0305644 A1 Oct. 3, 2019

(30) Foreign Application Priority Data
Mar. 30, 2018 (JP) .............................. JP2018-067415

(51) Int. Cl.
*H02K 9/193* (2006.01)
*H02K 1/28* (2006.01)
*H02K 7/108* (2006.01)

(52) U.S. Cl.
CPC ............... *H02K 9/193* (2013.01); *H02K 1/28* (2013.01); *H02K 7/108* (2013.01)

(58) Field of Classification Search
CPC .......... H02K 9/193; H02K 1/28; H02K 7/108; H02K 7/006; H02K 9/19
USPC .......................................... 310/54, 60 A, 61
See application file for complete search history.

(56) References Cited

U.S. PATENT DOCUMENTS

| 4,110,643 | A * | 8/1978 | Muller ..................... | H02K 9/19 310/125 |
| 8,536,743 | B2 * | 9/2013 | Kasuya .................... | B60K 6/48 310/54 |
| 8,678,115 | B2 * | 3/2014 | Kasuya .................... | B60K 1/00 180/65.1 |
| 9,051,976 | B2 * | 6/2015 | Kuwahara ............. | F16D 25/083 |
| 9,154,006 | B2 * | 10/2015 | Yamamoto ............... | H02K 1/32 |
| 2012/0032538 | A1 * | 2/2012 | Kasuya .................... | H02K 9/19 310/54 |
| 2012/0032544 | A1 * | 2/2012 | Kasuya .................... | B60K 1/00 310/90 |
| 2012/0217825 | A1 * | 8/2012 | Kasuya .................. | H02K 7/083 310/54 |

(Continued)

FOREIGN PATENT DOCUMENTS

JP 2009-072052 4/2009

*Primary Examiner* — John K Kim
(74) *Attorney, Agent, or Firm* — Oblon, McClelland, Maier & Neustadt, L.L.P.

(57) ABSTRACT

A rotating electric machine includes a case, a stator, a first rotary member including a rotor core and a first shaft, a second rotary member including a second shaft, and a multiple disc clutch. A first oil passage and a second oil passage are provided inside the case. The first oil passage starts from an inside of the first shaft or an inside of the second shaft, passes through the multiple disc clutch from an inner side to an outer side in a radial direction with respect to a rotation center, and reaches an inner side of the rotor core in the radial direction. The second oil passage starts from the inside of the first shaft or the inside of the second shaft and reaches the inner side of the rotor core in the radial direction without passing through the multiple disc clutch.

7 Claims, 6 Drawing Sheets

(56) References Cited

U.S. PATENT DOCUMENTS

| | | | |
|---|---|---|---|
| 2015/0033889 A1* | 2/2015 | Shibata | H02K 7/006 74/421 A |
| 2015/0239336 A1* | 8/2015 | Kasuya | B60L 50/16 74/661 |
| 2016/0013704 A1* | 1/2016 | Wagner | H02K 1/32 310/54 |
| 2016/0082825 A1* | 3/2016 | Ruder | H02K 7/10 192/113.21 |
| 2016/0245373 A1* | 8/2016 | Kasuya | B60K 6/40 |
| 2019/0305644 A1* | 10/2019 | Ideue | H02K 9/19 |

* cited by examiner

ROTATING ELECTRIC MACHINE

INCORPORATION BY REFERENCE

The disclosure of Japanese Patent Application No. 2018-067415 filed on Mar. 30, 2018 including the specification, drawings and abstract is incorporated herein by reference in its entirety.

BACKGROUND

1. Technical Field

The disclosure relates to a rotating electric machine.

2. Description of Related Art

A rotating electric machine has been known in which a multiple disc clutch is provided inward of a rotor core in a radial direction (for example, see Japanese Unexamined Patent Application Publication No. 2009-72052 (JP 2009-72052 A)). In the rotating electric machine described in JP 2009-72052 A, operating oil (oil) flowing from an inner side towards an outer side in the radial direction lubricates and cools the multiple disc clutch, and then cools the rotor core.

SUMMARY

However, with the foregoing conventional configuration, when a flowing amount of the operating oil necessary for cooling the rotor core is larger than a flowing amount of the operating oil necessary for lubricating and cooling the multiple disc clutch, a flowing amount of the operating oil supplied becomes equal to or more than an amount necessary for the multiple disc clutch, and a drag loss of the clutch can become large.

The disclosure provides a rotating electric machine that, for example, easily eliminates a tradeoff between an improvement of cooling performance for a rotor core by supplying operating oil and a reduction of a drag loss of a clutch, the drag loss being caused by supplying the operating oil.

A rotating electric machine according to an aspect of the disclosure includes, for example, a case, a stator that is fixed to the case and includes a coil, a first rotary member, a second rotary member, and a multiple disc clutch. The first rotary member is housed inside the case, supported by the case so as to rotate about a rotation center, and includes a rotor core and a first shaft. The rotor core faces an inner side of the stator in a radial direction with respect to the rotation center and includes a permanent magnet provided such that electromagnetic force acts between the permanent magnet and the coil. The first shaft extends along the rotation center. The second rotary member is housed inside the case, supported by the case so as to rotate about the rotation center, and includes a second shaft extending along the rotation center. The multiple disc clutch is positioned closer to the rotation center than the rotor core is, and switches a state of the first rotary member and the second rotary member between a connected state in which the first rotary member is connected to the second rotary member, and a disconnected state in which the first rotary member is disconnected from the second rotary member. A first oil passage and a second oil passage are provided inside the case. The first oil passage starts from an inside of the first shaft or an inside of the second shaft, passes through the multiple disc clutch from an inner side of the multiple disc clutch to an outer side of the multiple disc clutch in the radial direction with respect to the rotation center, and reaches an inner side of the rotor core in the radial direction. The second oil passage starts from the inside of the first shaft or the inside of the second shaft and reaches the inner side of the rotor core in the radial direction without passing through the multiple disc clutch.

With the configuration, as an oil passage that reaches the rotor core, the second oil passage that does not pass through the multiple disc clutch is provided in addition to the first oil passage. Therefore, a tradeoff between an improvement of cooling performance for the rotor core by supplying oil (operating oil), and a reduction of a drag loss of the clutch is easily eliminated, the drag loss being caused by supplying the oil (operating oil).

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
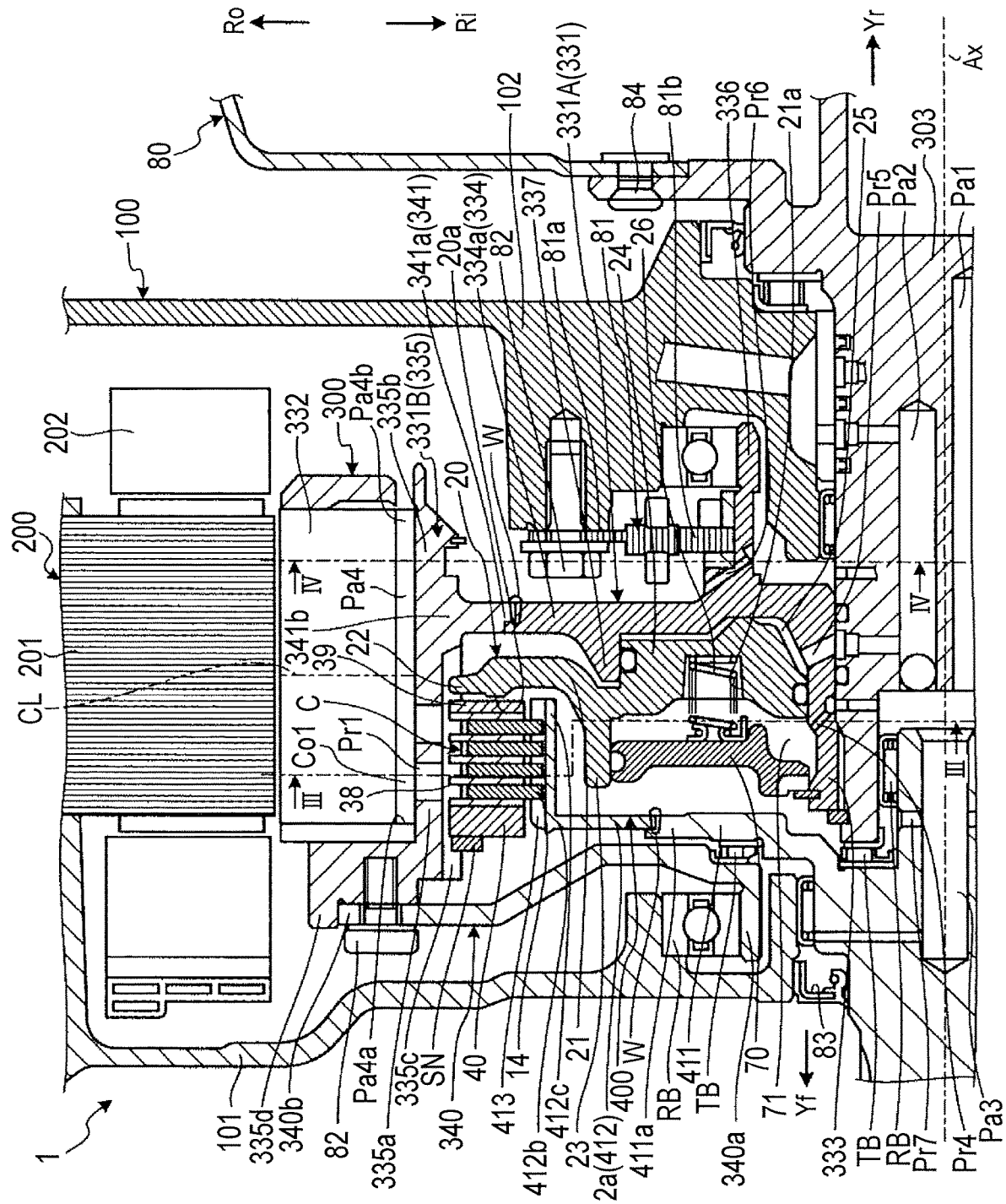
FIG. 1 is an exemplary and schematic sectional view of a portion of a rotating electric machine according to an embodiment on a first side with respect to a rotation center axis in a radial direction.

Hereinafter, an embodiment of the disclosure is disclosed. A configuration of the embodiment described below, and actions and results (effects) derived from the configuration are examples. The disclosure can be carried out with other configuration than the configuration disclosed in the following embodiment. According to the disclosure, at least one of various effects (including derivative effects) obtained from these configurations is obtained. In the drawings, a rotation center axis of a rotating electric machine 1 is denoted by Ax, a front side in the axis direction is denoted by Yf, and a rear side in the axis direction is denoted by Yr. An outer side of the radial direction is denoted by Ro, and an inner side of the radial direction is denoted by Ri. W represents a weld portion.

Figure 2:
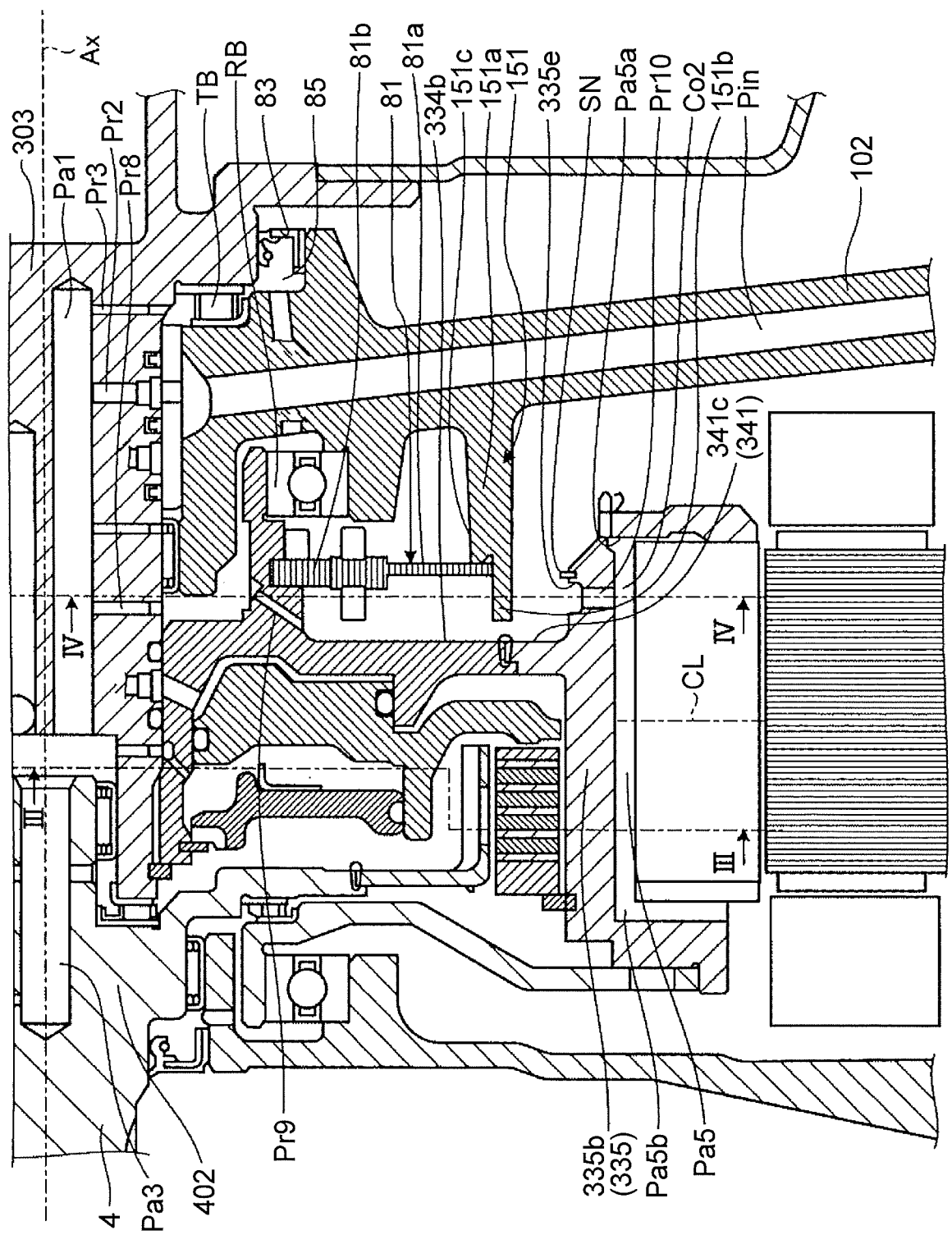
FIG. 2 is an exemplary and schematic sectional view of a portion of the rotating electric machine according to the embodiment on a second side with respect to the rotation center axis in the radial direction.

FIG. 1 is an exemplary and schematic sectional view of a portion of a rotating electric machine according to the embodiment on a first side with respect to the rotation center axis in the radial direction. FIG. 2 is an exemplary and schematic sectional view of a portion of the rotating electric machine according to the embodiment on a second side with respect to the rotation center axis in the radial direction.

As shown in FIG. 1 and FIG. 2, the rotating electric machine 1 according to the embodiment includes a case 100, a stator 200, a first rotary member 300, a second rotary member 400, and a multiple disc clutch C.

The case 100 includes a front-side case 101 and a rear-side case 102. The front-side case 101 is positioned on the front side in the axis direction, and the rear-side case 102 is positioned on the rear side in the axis direction. Inside the case 100, the stator 200, the first rotary member 300, the second rotary member 400, and the multiple disc clutch C are housed.

The stator 200 includes a laminated steel plate 201 and a coil 202. In the laminated steel plate 201, a plurality of steel plates is stacked. The coil 202 annularly covers a side portion of the laminated steel plate 201. The laminated steel plate 201 is fixed to the front-side case 101.

The first rotary member 300 includes a first shaft 303, a rotor hub 331, and a rotor core 332.

The first shaft 303 extends along the rotation center axis Ax and is supported so as to rotate around the rotation center axis Ax. Thus, the first rotary member 300 is supported so as to rotate around the rotation center axis Ax. The rotor hub 331 is provided on an outer periphery of the first shaft 303. A torque converter 80 is positioned on the rear side of the first shaft 303 in the axis direction. The torque converter 80 is fixed to the first shaft 303 through a rivet 84.

The rotor hub 331 includes an inner side hub 331A, and an outer side hub 331B that is positioned outward of the inner side hub 331A in the radial direction. The inner side hub 331A and the outer side hub 331B are joined to each other through a weld portion W.

The inner side hub 331A includes an inner peripheral cylindrical portion 333, a ring-shaped wall portion 334 (a first wall portion), a projection 337, and a support wall portion 336. The inner peripheral cylindrical portion 333 extends in the axis direction of the rotation center axis Ax along the outer periphery of the first shaft 303. The ring-shaped wall portion 334 expands towards the outer side in the radial direction from a rear end portion of the inner peripheral cylindrical portion 333 in the axis direction to an end portion 334a. The projection 337 projects from the ring-shaped wall portion 334 to the front side in the axis direction. The support wall portion 336 is positioned inward of the projection 337 in the radial direction and extends from the ring-shaped wall portion 334 to the rear side in the axis direction.

The outer side hub 331B includes a vertical wall portion 341 (the first wall portion) and a rotor core holding portion 335. The vertical wall portion 341 extends from an end portion 341a on the inner side in the radial direction to the outer side in the radial direction. The rotor core holding portion 335 extends from an end portion 341b of the vertical wall portion 341 on the outer side in the radial direction to the front side and the rear side in the axis direction. Each of the ring-shaped wall portion 334 and the vertical wall portion 341 is an example of the first wall portion.

The rotor core holding portion 335 includes a front-side holding portion 335a and a rear-side holding portion 335b (a fourth wall portion). The front-side holding portion 335a is positioned ahead of the end portion 341b in the axis direction, and the rear-side holding portion 335b is positioned behind of the end portion 341b in the axis direction. The front-side holding portion 335a is provided with a radial-direction passage Pr1 that extends through the front-side holding portion 335a in the radial direction and forms a part of an oil passage where oil OL (operating oil) is allowed to flow. Also, a spline 335c (see FIG. 1, FIG. 3) is provided on the inner side of the front-side holding portion 335a in the radial direction. The spline 335c extends in the axis direction. In the embodiment, four first friction plates 38 and two end plates 39, 40 are spline fitted to the spline 335c at intervals in the axis direction. Specifically, the end plates 39, 40 are positioned at both ends in the axis direction, respectively, and the four first friction plates 38 are spline fitted between the end plates 39, 40 that are positioned at both ends, respectively. Due to the spline fitting, the end plates 39, 40 and the first friction plates 38 are able to slide in the axis direction and restricted from moving in a circumferential direction. Further, the end plate 40 is restricted from moving to the front side in the axis direction by a snap SN. The rear-side holding portion 335b is an example of the fourth wall portion.

The rotor core 332 is provided on the outer side of the rotor core holding portion 335 in the radial direction. Although not shown, the rotor core 332 includes a laminated steel plate and a permanent magnet. In the laminated steel plate, a plurality of steel plates is arrayed along the axis direction. The rotor core 332 faces the inner side of the laminated steel plate 201 of the stator 200 in the radial direction, and electromagnetic force acts between the permanent magnet and the coil 202 of the stator 200. A rotor core supporting wall portion 340 (a third wall portion) is provided in a front end portion 335d of the rotor core holding portion 335 in the axis direction. The rotor core supporting wall portion 340 extends from the outer side to the inner side in the radial direction. The rotor core supporting wall portion 340 is described later.

The second rotary member 400 is provided inward of an inner periphery the front-side holding portion 335a of the rotor core holding portion 335 (i.e., the second rotary member 400 is provided inward of the front-side holding portion 335a of the rotor core holding portion 335 in the radial direction). Specifically, the second rotary member 400 includes a second shaft 402, a friction plate support portion 411, and a friction plate holding portion 412.

As shown in FIG. 2, the second shaft 402 extends along the rotation center axis Ax and is supported so as to rotate about the rotation center axis Ax. Thus, the second rotary member 400 is supported so as to rotate about the rotation center axis Ax. As shown in FIG. 1 and FIG. 2, a front end portion of the first shaft 303 in the axis direction is provided as a cylindrical portion, and an end portion of the second shaft 402 on the rear side in the axis direction is inserted into the cylindrical portion. The second shaft 402 and the first shaft 303 are supported by each other through a thrust bearing TB and a radial bearing RB so that the second shaft 402 and the first shaft 303 can rotate. A crankshaft 4 of an engine is positioned ahead of the second shaft 402 in the axis direction, and the crankshaft 4 and the second shaft 402 are configured integrally (i.e., provided integrally). Therefore, the second shaft 402 rotates as the crankshaft 4 is driven to rotate.

As shown in FIG. 1, the friction plate support portion 411 (a second wall portion) extends towards the outer side in the radial direction from the second shaft 402 to a distal end portion 411a. The friction plate holding portion 412 is configured so as to have an L-shaped section. Specifically, the friction plate holding portion 412 includes a vertical wall portion 412a (the second wall portion) and a friction plate holding portion 412c. The vertical wall portion 412a is joined to the distal end portion 411a through a weld portion W and extends to the outer side in the radial direction. The friction plate holding portion 412c is bent at an end portion 412b of the vertical wall portion 412a on the outer side in the radial direction, and extends towards the rear side in the axis direction. A spline 413 (see FIG. 1, FIG. 3) is provided along the axis direction in an outer side portion of the friction plate holding portion 412c in the radial direction. In the embodiment, four second friction plates 14 extending in the radial direction are spline fitted to the spline 413 at intervals in the axis direction. Due to the spline fitting, the second friction plates 14 are able to slide in the axis direction and restricted from moving in the circumferential direction. Each of the friction plate support portion 411 and the vertical wall portion 412a is an example of the second wall portion.

A clutch piston 20 and a cancel plate 70 are provided between the first rotary member 300 and the second rotary member 400 so that the clutch piston 20 and the cancel plate 70 are able to slide in the axis direction. The clutch piston 20 includes a piston body portion 21, a fitting projection 22, a projection 23, and a step portion 24. The piston body portion 21 extends from the inner side to the outer side in the radial direction. The fitting projection 22 is provided in an outer side end portion of the piston body portion 21 in the radial direction. The projection 23 projects from an intermediate portion of the piston body portion 21 in the radial direction to the front side in the axis direction. The step portion 24 projects from an intermediate portion of the piston body portion 21 in the radial direction to the rear side in the axis direction. The step portion 24 is in sliding contact with the projection 337 of the ring-shaped wall portion 334.

A rear side of the clutch piston 20 in the axis direction and the front side of the ring-shaped wall portion 334 in the axis direction define a piston oil chamber 25. The projection 23 of the clutch piston 20, the inner peripheral cylindrical portion 333 of the rotor hub 331, the piston body portion 21, and the cancel plate 70 positioned ahead of the piston body portion 21 in the axis direction define a cancel oil chamber 71. A holding recessed portion 21a is provided in a front side of the piston body portion 21 in the axis direction, and a return spring 26 extending in the axis direction is housed and held in the holding recessed portion 21a. The fitting projection 22 is spline fitted to the spline 335c of the rotor core holding portion 335. A projecting pressing portion 20a is provided on the inner side of the fitting projection 22 in the radial direction so that the projecting pressing portion 20a projects towards the front side in the axis direction. The pressing portion 20a faces the end plate 39.

The multiple disc clutch C includes the first friction plates 38 and the end plates 39, 40, as well as the second friction plates 14 described above. Each of the first friction plates 38 and each of the second friction plates 14 face each other, and the first friction plates 38 and the second friction plates 14 are positioned alternately along the axis direction. The end plate 40 on the front side in the axis direction is restricted by the snap SN from moving to the front side in the axis direction. As described above, the multiple disc clutch C is positioned closer to the rotation center axis Ax than the rotor core 332 is.

With such a configuration, when the clutch piston 20 moves to the front side in the axis direction, the pressing portion 20a presses the end plate 39 on the rear side in the axis direction. Then, the four first friction plates 38 and the four second friction plates 14 are sandwiched between the end plates 39, 40 that are respectively positioned at both ends in the axial direction. The four first friction plates 38 and the four second friction plates 14 are alternately disposed in the axis direction. Therefore, the first friction plates 38 and the second friction plates 14 are unable to rotate with respect to each other (connected with each other) due to frictional force caused by a pressing load from the clutch piston 20. Thus, the crankshaft 4, the second rotary member 400, the multiple disc clutch C, the first rotary member 300, and the torque converter 80 are able to rotate integrally. Meanwhile, when the clutch piston 20 moves to the rear side in the axis direction, the pressing portion 20a is separated from the end plate 39 on the rear side in the axis direction. Then, the first friction plates 38 and the second friction plates 14 are separated from each other in the axis direction and able to rotate with respect to each other (disconnected from each other).

A resolver 81 is provided behind the ring-shaped wall portion 334 in the axis direction to extend from the inner side hub 331A to the rear-side case 102. Specifically, the resolver 81 includes a stator 81a and a rotor 81b. The stator 81a is fastened to the rear-side case 102 by a bolt 82, and the rotor 81b is provided in the support wall portion 336. The resolver 81 is a rotational speed detection device that detects rotational speed of the rotor 81b.

As shown in FIG. 2, a projecting wall portion 151 projects from the rear-side case 102 to the front side in the axis direction. The projecting wall portion 151 has a base end portion 151a, and a distal end support portion 151b provided in a distal end of the base end portion 151a in the axis direction. A step portion 151c provided between the base end portion 151a and the distal end support portion 151b supports a radially outer side end of the stator 81a of the resolver 81, in the axis direction and the radial direction. Thus, the projecting wall portion 151 extends in the axis direction towards an end surface 334b of the ring-shaped wall portion 334 and an end surface 341c of the vertical wall portion 341, and also extends in a direction about the rotation center axis Ax (the circumferential direction). The projecting wall portion 151 faces the end surfaces 334b, 341c with a gap in the axis direction.

Further, as shown in FIG. 1, the front end portion 335d of the rotor core holding portion 335 in the axis direction is supported by the rotor core supporting wall portion 340. The rotor core supporting wall portion 340 spreads towards the outer side in the radial direction from an inner side end portion 340a in the radial direction to an outer periphery end portion 340b, and the outer periphery end portion 340b is supported by the front end portion 335d through a bolt 82. The inner side end portion 340a is supported on the friction plate support portion 411 by the thrust bearing TB so that the inner side end portion 340a is able to rotate. The inner side end portion 340a is also supported on the front-side case 101 by the radial bearing RB so that the inner side end portion 340a is able to rotate. A ring-shaped seal 83 is provided between an inner side end portion of the front-side case 101 in the radial direction and an outer peripheral surface of the second shaft 402.

As shown in FIG. 1 and FIG. 2, the first shaft 303 is provided with two axis direction passages Pa1, Pa2, and radial direction passages Pr2, Pr3, Pr8. The axis direction passages Pa1, Pa2 extend in a center portion of the first shaft 303 in a radial direction along the axis direction of the rotation center axis Ax and form a part of an oil passage. The radial direction passages Pr2, Pr3, Pr8 communicate with the axis direction passages Pa1, Pa2 and extend through the first shaft 303 in the radial direction. As shown in FIG. 2, an entrance-side passage Pin extends in the rear-side case 102 along the radial direction. The entrance-side passage Pin communicates with the axis direction passage Pa1 through the radial direction passage Pr2. Further, as shown in FIG. 1, radial direction passages Pr4, Pr5 are provided in the inner peripheral cylindrical portion 333 of the rotor hub 331. The support wall portion 336 of the rotor hub 331 is provided with the radial direction passages Pr6, Pr9. The radial direction passage Pr4 communicates with the cancel oil chamber 71, and the radial direction passage Pr5 communicates with the piston oil chamber 25.

The second shaft 402 is provided with an axis direction passage Pa3 and a radial direction passage Pr7 that communicates with the axis direction passage Pa3.

When oil OL flows into the piston oil chamber 25 from the radial direction passage Pr5, the clutch piston 20 slides to the front side in the axis direction. Then, the return spring 26 contracts and applies urging force that urges the clutch piston 20 to return to the rear side in the axis direction. When oil OL flows into the cancel oil chamber 71, the clutch piston 20 is further urged to return to the rear side in the axis direction even further.

As shown in FIG. 2, a radial-direction passage Pr10 is provided in the rear-side holding portion 335b (the fourth wall portion), the radial-direction passage Pr10 extending through the rear-side holding portion 335b in the radial direction. A groove 335e is provided inward of the radial-direction passage Pr10 in the radial direction. The groove 335e has a larger width than that of the radial-direction passage Pr10. The radial-direction passage Pr10 communicates with the groove 335e. This means that the groove 335e is provided in an inner peripheral surface of the rear-side holding portion 335b, and the groove 335e communicates with the radial-direction passage Pr10. The rear-side holding portion 335b is an example of the fourth wall portion.

Figure 3:
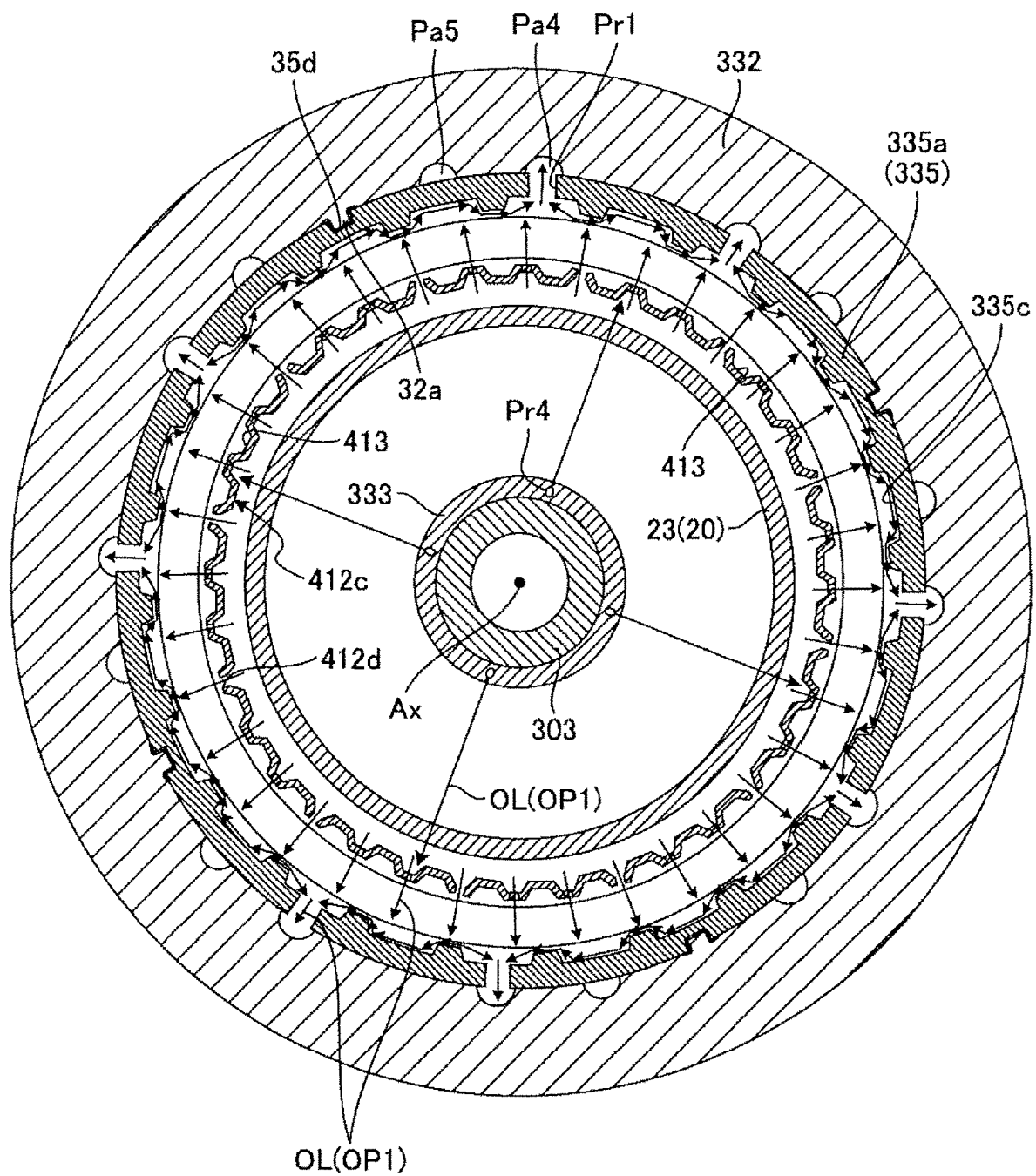
FIG. 3 is a sectional view taken along the line III-III in FIG. 1 and FIG. 2 and shows flows of oil with arrows.
Figure 4:
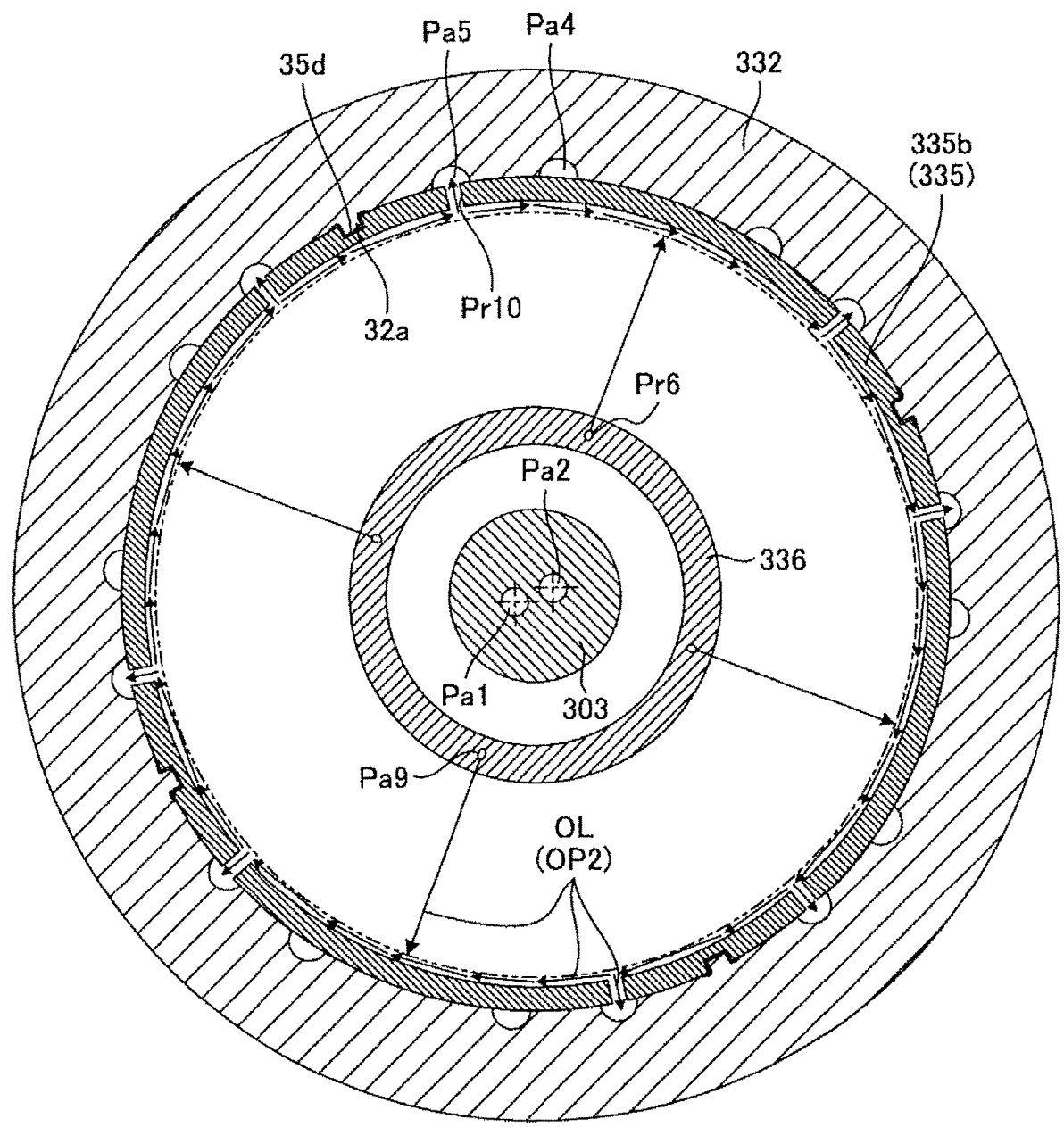
FIG. 4 is a sectional view taken along the line IV-IV in FIG. 1 and FIG. 2 and shows flows of oil with arrows.

FIG. 3 is a sectional view taken along the III-III line in FIG. 1 and FIG. 2 and shows flows of oil OL with arrows. FIG. 4 is a sectional view taken along the IV-IV line in FIG. 1 and FIG. 2 and shows flows of oil OL with arrows.

As shown in FIG. 3 and FIG. 4, on the inner side of the rotor core 332 in the radial direction, a plurality of axis direction passages Pa4, Pa5 extending along the axis direction is provided at intervals in the circumferential direction. In the embodiment, the axis direction passage that communicates with the radial-direction passage Pr1 is referred to as the first axis direction passage Pa4, and the axis direction passage that communicates with the radial-direction passage Pr10 is referred to as the second axis direction passage Pa5. As shown in FIG. 1, a connecting position between the radial-direction passage Pr1 and the first axis direction passage Pa4 is referred to as a first connecting position Co1. As shown in FIG. 2, a connecting position between the radial-direction passage Pr10 and the second axis direction passage Pa5 is referred to as a second connecting position Co2. The first connecting position Co1 and the second connecting position Co2 are positioned on opposite sides of an intermediate position CL of the rotor core 332 in the axis direction from one another.

As shown in FIG. 3 and FIG. 4, four projecting portions 32a projecting to the inner side in the radial direction are provided in an inner periphery of the rotor core 332 at intervals in the circumferential direction. In an outer periphery of the rotor core holding portion 335, four recessed portions 35d are provided at intervals in the circumferential direction so as to be fitted to the projecting portions 32a, respectively. As shown in FIG. 1, in the first axis direction passage Pa4, a front end Pa4a in the axis direction is closed, and a rear end Pa4b is open. As shown in FIG. 2, in the second axis direction passage Pa5, a rear end Pa5a in the axis direction is closed, and a front end Pa5b is open.

Next, configurations of the first oil passage OP1 through the fifth oil passage OP5 according to the embodiment are described. As shown in FIG. 1, the first oil passage OP1 (see FIG. 5) starts at the axis direction passage Pa3 of the second shaft 402, passes through the radial direction passage Pr7, passes through an area between the cancel plate 70 and the friction plate support portion 411, and reaches the inner peripheral side of the friction plate holding portion 412c. As shown in FIG. 3, since through-holes 412d are provided in the friction plate holding portion 412c, the first oil passage OP1 extends from the inner peripheral side of the friction plate holding portion 412c to the multiple disc clutch C (see FIG. 1) through the through-holes 412d, and, as shown in FIG. 1 and FIG. 3, the first oil passage OP1 passes through the radial-direction passage Pr1 of the front-side holding portion 335a and reaches the inner side of the rotor core 332 in the radial direction. As described above, the first oil passage OP1 is an oil passage that passes through the multiple disc clutch C from the inner side to the outer side in the radial direction (the radial direction with respect to the rotation center), and reaches the inner side of the rotor core 332 in the radial direction.

As shown in FIG. 2, the second oil passage OP2 (see FIG. 6) passes through the radial direction passages Pr8 and Pr9 from the axis direction passage Pa1 of the first shaft 303, extends to the outer side in the radial direction along the end surface 334b (a first section) of the ring-shaped wall portion 334, passes through the groove 335e and the radial-direction passage Pr10, and reaches the inner side of the rotor core 332 in the radial direction. The end surface 334b of the ring-shaped wall portion 334 and the end surface 341c of the vertical wall portion 341 are examples of the first section. As described above, the second oil passage OP2 is an oil passage that reaches the inner side of the rotor core 332 in the radial direction without passing through the multiple disc clutch C.

As described in FIG. 1, the third oil passage OP3 (see FIG. 5) is formed of the first axis direction passage Pa4 provided on the inner side of the rotor core 332 in the radial direction to extend along the axis direction.

As described in FIG. 2, the fourth oil passage OP4 (see FIG. 6) is formed of the second axis direction passage Pa5 provided on the inner side of the rotor core 332 in the radial direction to extend along the axis direction.

As shown in FIG. 2, the fifth oil passage OP5 (see FIG. 6) passes through the radial direction passage Pr3 and the thrust bearing TB from the axis direction passage Pa1, passes through an oil reservoir 85 where the seal 83 is provided, and the radial bearing RB, and extends from the projecting wall portion 151 to join to the second oil passage OP2 extending along the end surface 334b.

Figure 5:
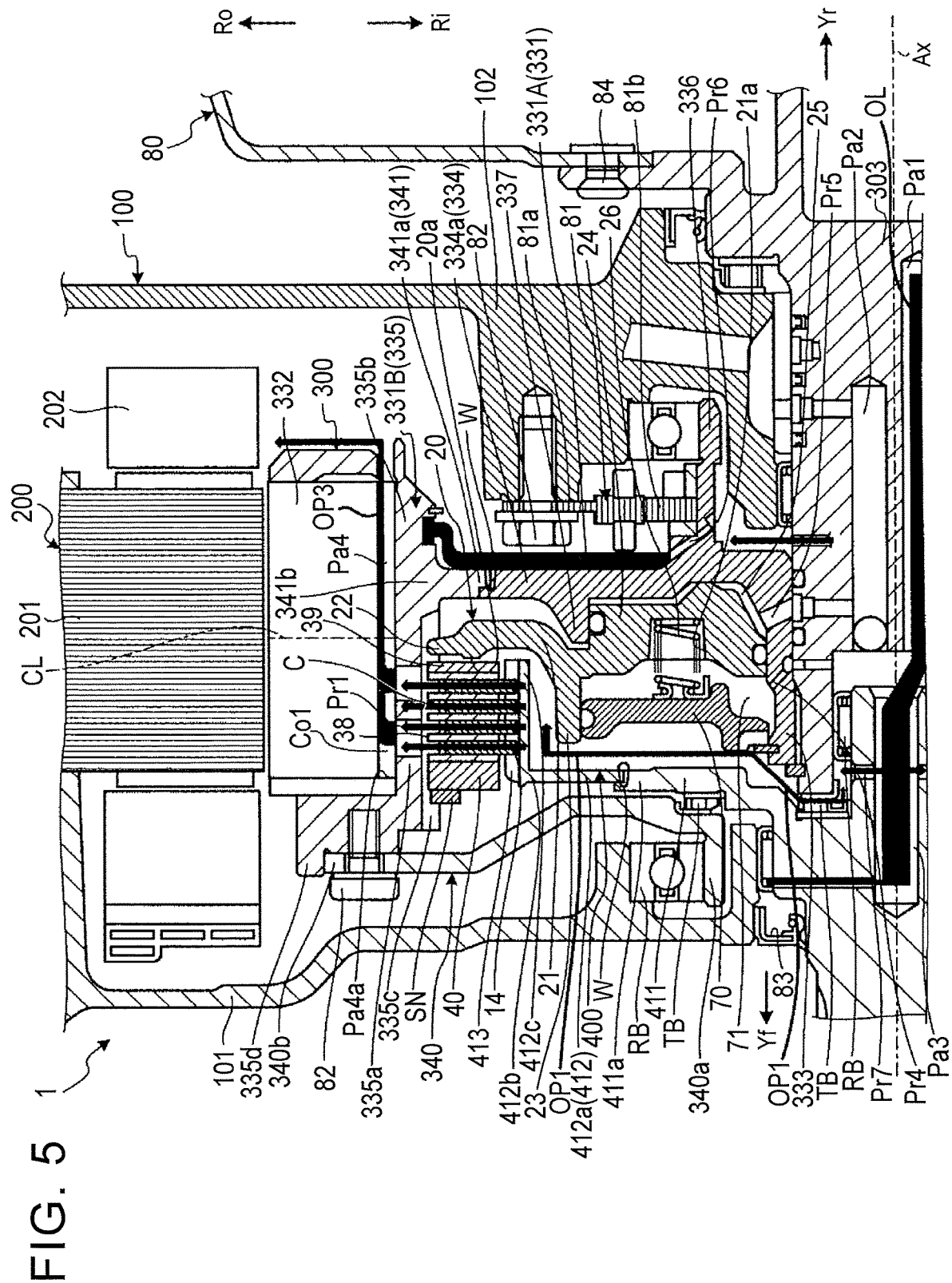
FIG. 5 is an exemplary and schematic sectional view of the portion of the rotating electric machine shown in FIG. 1 and shows flows of oil on the first side in the radial direction.
Figure 6:
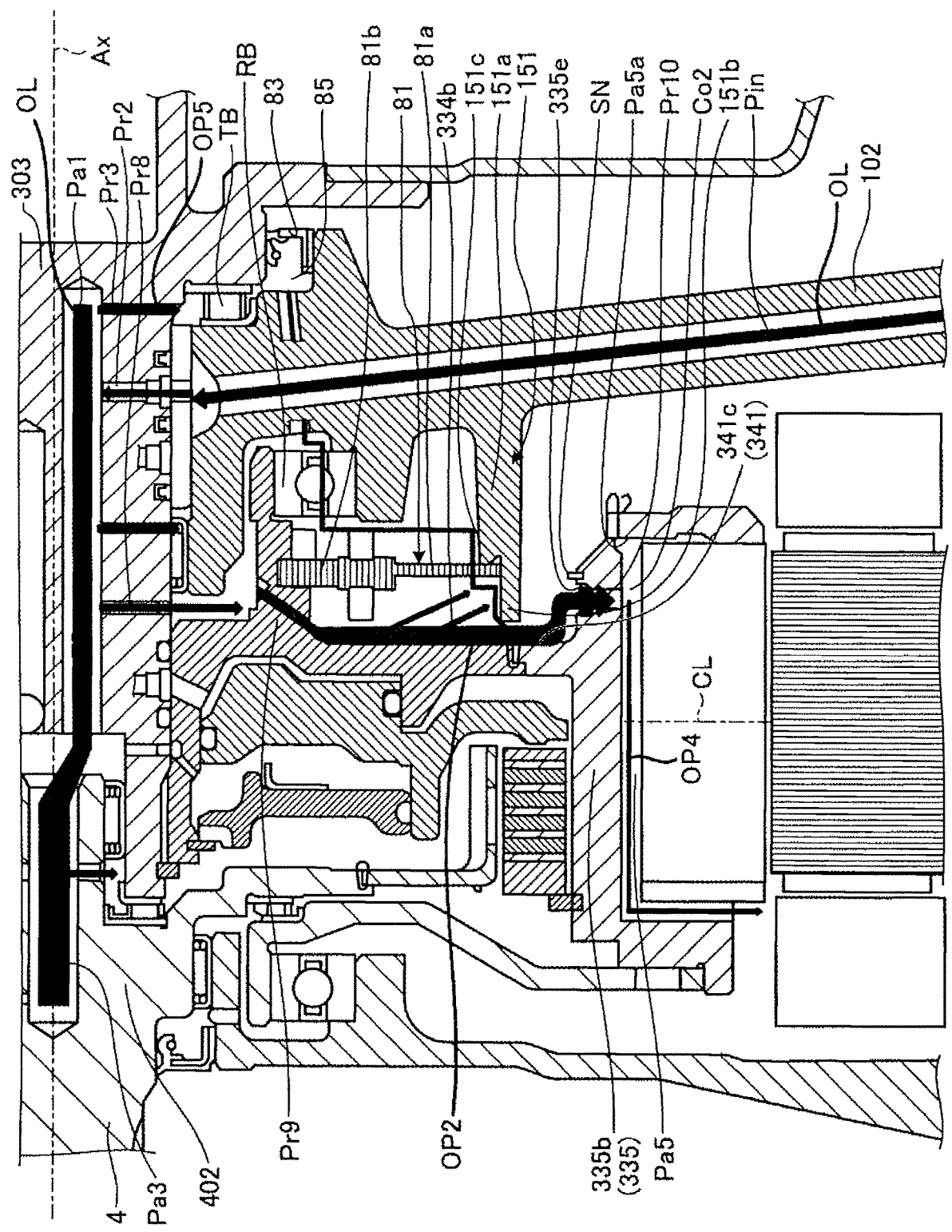
FIG. 6 is an exemplary and schematic sectional view of the portion of the rotating electric machine shown in FIG. 2 and shows flows of oil on the second side in the radial direction.

Next, with reference to FIG. 5 and FIG. 6, a flow of oil OL in each of the oil passages is described briefly. FIG. 5 is an exemplary and schematic sectional view of the rotating electric machine shown in FIG. 1 and shows flows of oil OL on the first side in the radial direction. FIG. 6 is an exemplary and schematic sectional view of the rotating electric machine shown in FIG. 2 and shows flows of oil OL on the second side in the radial direction.

As shown by the thick black arrow in FIG. 6, oil OL that flows into the rotating electric machine 1 from the entrance-side passage Pin provided in the rear-side case 102 of the case 100 flows into the axis direction passage Pa3 of the second shaft 402 from the radial direction passage Pr2 through the axis direction passage Pa1 of the first shaft 303.

First of all, a flow of oil OL inside the first oil passage OP1 is described. As shown in FIG. 5, in the first oil passage OP1, oil OL passes between the cancel plate 70 and the friction plate support portion 411 from the axis direction passage Pa3 of the second shaft 402. Next, as shown in FIG. 3, oil OL, which goes through the multiple disc clutch C (see FIG. 1) from the inner peripheral side of the friction plate holding portion 412c through the through-holes 412d, reaches the inner side of the rotor core 332 in the radial direction through the radial-direction passage Pr1 of the front-side holding portion 335a as shown in FIG. 5.

As shown in FIG. 6, in the second oil passage OP2, oil OL passes through the radial direction passages Pr8 and Pr9 from the axis direction passage Pa1 of the first shaft 303, and flows to the outer side in the radial direction along the end surface 334b and the end surface 341c (the first section). Next, oil OL passes through the groove 335e and the radial-direction passage Pr10 and reaches the inner side of the rotor core 332 in the radial direction.

As shown in FIG. 5, in the third oil passage OP3, oil OL flows in the axis direction passage Pa4 to the rear side in the axis direction. The axis direction passage Pa4 is provided on the inner side of the rotor core 332 in the radial direction. The first oil passage OP1 and the third oil passage OP3 are connected with each other at the first connecting position Co1. This means that the third oil passage OP3 extends towards the rear side in the axis direction from the first connecting position Co1 to the rear end Pa4b (see FIG. 1).

As shown in FIG. 6, in the fourth oil passage OP4, oil OL flows in the axis direction passage Pa5 to the front side in the axis direction. The axis direction passage Pa5 is provided on the inner side of the rotor core 332 in the radial direction. The second oil passage OP2 and the fourth oil passage OP4 are connected with each other at the second connecting position Co2. This means that the fourth oil passage OP4 extends towards the front side in the axis direction from the second connecting position Co2 to the front end Pa5b (see FIG. 2). In the fifth oil passage OP5, oil OL flows from the axis direction passage Pa1, passes through the radial direction passage Pr3 and the oil reservoir 85, and then flows from the projecting wall portion 151 into the second oil passage OP2.

As described above, in the rotating electric machine 1 according to the embodiment, the first oil passage OP1 and the second oil passage OP2 are provided. For example, the first oil passage OP1 starts from an inside of the second shaft 402, passes through the multiple disc clutch C from the inner side to the outer side in the radial direction, and reaches the inner side of the rotor core 332 in the radial direction. The second oil passage OP2 starts from an inside of the first shaft 303, and reaches the inner side of the rotor core 332 in the radial direction without passing through the multiple disc clutch C.

Therefore, as an oil passage that reaches the rotor core 332, the second oil passage OP2 that does not pass through the multiple disc clutch C is provided in addition to the first oil passage OP1. Therefore, it is possible to cool the rotor core 332 while reducing an amount of oil OL that passes through the multiple disc clutch C to an adequate amount. Thus, it is possible to restrain the multiple disc clutch C from dragging.

This means that, in a case where the first oil passage OP1 is the only oil passage that reaches the rotor core 332, when an amount of oil is increased in order to cool the rotor core 332, an amount of oil passing through the multiple disc clutch C also increases. This could cause dragging of the multiple disc clutch C. However, as described in the embodiment, when there are the first oil passage OP1 and the second oil passage OP2, the first oil passage OP1 is able to send an adequate amount of oil OL for cooling the multiple disc clutch C, and the second oil passage OP2 is able to send an amount of oil OL that covers an insufficient amount (a shortage) of oil sent by the first oil passage OP1 for cooling the rotor core 332. Therefore, an amount of oil OL passing through the multiple disc clutch C is reduced to an appropriate amount, thereby cooling the rotor core 332 while restraining dragging of the multiple disc clutch C.

The third oil passage OP3 and the fourth oil passage OP4 are provided. In the third oil passage OP3, oil OL flows along the axis direction of the rotation center axis Ax on the inner side of the rotor core 332 in the radial direction. In the fourth oil passage OP4, oil OL flows along the axis direction on the inner side of the rotor core 332 in the radial direction.

Therefore, the inner side of the rotor core 332 in the radial direction is cooled by oil OL that flows in the third oil passage OP3 and the fourth oil passage OP4. Therefore, cooling efficiency for the rotor core 332 improves.

The first connecting position Co1 between the first oil passage OP1 and the third oil passage OP3, and the second connecting position Co2 between the second oil passage OP2 and the fourth oil passage OP4 are positioned on opposite sides of the intermediate position CL in the axis direction of the rotor core 332 from each other.

Therefore, a flow direction of oil OL inside the third oil passage OP3 and a flow direction of oil OL inside the fourth oil passage OP4 are opposite to each other in the axis direction. Specifically, in the third oil passage OP3, oil OL flows towards the rear side in the axis direction from the first connecting position Co1 to the rear end Pa4b (the end portion in the axis direction). In the fourth oil passage OP4, oil OL flows towards the front side in the axis direction from the second connecting position Co2 to the front end Pa5b (the end portion in the axis direction). Since oil OL flows while exchanging heat with the rotor core 332, temperature of oil OL gradually increases while flowing in the third oil passage OP3 or the fourth oil passage OP4. Specifically, in the third oil passage OP3, temperature of oil OL becomes the lowest at the first connecting position Co1, and temperature of oil OL becomes the highest at the rear end Pa4b on the opposite side of the intermediate position CL of the rotor core 332 in the axis direction from the first connecting position Co1. In the fourth oil passage OP4, temperature of oil OL becomes the lowest at the second connecting position Co2, and temperature of oil OL becomes the highest at the front end Pa5b on the opposite side of the intermediate position CL of the rotor core 332 in the axis direction from the second connecting position Co2. As described above, a portion where temperature of oil OL is high and a portion where temperature of oil OL is low are positioned on opposite sides of the intermediate position CL of the rotor core 332 in the axis direction from each other, and positioned alternately in the circumferential direction of the rotating electric machine 1. Therefore, cooled portions are evenly provided in the entire rotor core 332 in the axis direction.

The first rotary member 300 has the ring-shaped wall portion 334 and the vertical wall portion 341 (the first wall portion) extending in the radial direction between the first shaft 303 and the rotor core 332, and the multiple disc clutch C and the first oil passage OP1 are provided on the opposite side of the first wall portion from the second oil passage OP2.

As described above, since the ring-shaped wall portion 334 and the vertical wall portion 341 (the first wall portion) are provided between the first oil passage OP1 and the second oil passage OP2, oil OL flowing in the first oil passage OP1 and oil OL flowing in the second oil passage OP2 are separated from each other.

The second rotary member 400 has the friction plate support portion 411 and the vertical wall portion 412a (the second wall portion) extending in the radial direction between the second shaft 402 and the multiple disc clutch C, and the first rotary member 300 has the rotor core supporting wall portion 340 (the third wall portion).

Therefore, the friction plate support portion 411 and the vertical wall portion 412a (the second wall portion), as well as the rotor core supporting wall portion 340 (the third wall portion) are provided outward of the first oil passage OP1 in the axis direction. Thus, oil OL flowing in the first oil passage OP1 is restrained from leaking to the outer side in the axis direction from the second wall portion and the third wall portion.

The second oil passage OP2 includes the first section that extends along the end surface 334b of the ring-shaped wall portion 334 and the end surface 341c of the vertical wall portion 341 (an end surface of the first wall portion), and the case 100 has the projecting wall portion 151 extending in the axis direction towards the end surfaces 334b, 341c.

As described above, since the first section extends along the end surfaces 334b, 341c, it is not necessary to newly provide a member that forms an oil passage. Thus, a configuration of the rotating electric machine 1 becomes simple, and manufacturing cost is reduced. Further, in the first section, since the oil OL flows along the end surfaces 334b, 341c, the oil OL tends to scatter. Therefore, the projecting wall portion 151 is able to receive scattered oil OL.

The first rotary member 300 has the cylindrical rear-side holding portion 335b (the fourth wall portion), and the second oil passage OP2 includes the ring-shaped groove 335e provided in the inner peripheral surface of the rear-side holding portion 335b.

In the first section, since oil OL flows along the end surfaces 334b, 341c, oil OL tends to scatter in the axis direction. Therefore, the rear-side holding portion 335b (the fourth wall portion) extending in the axis direction, and the groove 335e are able to receive scattered oil OL efficiently.

The embodiment of the disclosure has been described so far. However, the foregoing embodiment is just an example, and is not intended to limit a range of the disclosure. It is possible to carry out the embodiment in various other forms, and various omissions, replacements, combinations, and changes may be made without departing from the scope of the disclosure. Further, configurations and shapes of the respective examples may be partially replaced. Furthermore, specifications of each of the configurations, shapes and so on (structures, kinds, directions, shapes, sizes, lengths, widths, heights, numbers, arrangement, positions, and so on) may be changed as appropriate to carry out the disclosure. For example, in the embodiment, an inside of the second shaft 402 communicates with the first oil passage OP1, and an inside of the first shaft 303 communicates with the second oil passage OP2. However, the inside of the second shaft 402 may communicate with the second oil passage OP2, and the inside of the first shaft 303 may communicate with the first oil passage OP1.

What is claimed is:

1. A rotating electric machine comprising:
 a case;
 a stator that is fixed to the case and includes a coil;
 a first rotary member that is housed inside the case, supported by the case so as to rotate about a rotation center, and includes a rotor core and a first shaft, the rotor core facing an inner side of the stator in a radial direction with respect to the rotation center and including a permanent magnet provided such that electromagnetic force acts between the permanent magnet and the coil, and the first shaft extending along the rotation center;
 a second rotary member that is housed inside the case, supported by the case so as to rotate about the rotation center, and includes a second shaft extending along the rotation center; and
 a multiple disc clutch that is positioned closer to the rotation center than the rotor core is, and switches a state of the first rotary member and the second rotary member between a connected state in which the first rotary member is connected to the second rotary member, and a disconnected state in which the first rotary member is disconnected from the second rotary member, wherein:
 a first oil passage and a second oil passage are provided inside the case;
 the first oil passage starts from one of an inside of the first shaft and an inside of the second shaft, passes through the multiple disc clutch from an inner side of the multiple disc clutch to an outer side of the multiple disc clutch in the radial direction with respect to the rotation center, and reaches an inner side of the rotor core in the radial direction;
 the second oil passage starts from an other of the inside of the first shaft and the inside of the second shaft and reaches the inner side of the rotor core in the radial direction without passing through the multiple disc clutch;
 a third oil passage and a fourth oil passage are provided inside the case;
 the third oil passage is an oil passage in which oil that has reached the inner side of the rotor core in the radial direction through the first oil passage flows in an axis direction of the rotation center on the inner side of the rotor core in the radial direction;
 the fourth oil passage is an oil passage in which the oil that has reached the inner side of the rotor core in the radial direction through the second oil passage flows in the axis direction of the rotation center on the inner side of the rotor core in the radial direction;
 a first connecting position between the first oil passage and the third oil passage, and a second connecting position between the second oil passage and the fourth oil passage are disposed on opposite sides of an intermediate position of the rotor core in the axis direction from one another; and
 the third oil passage extends along the axis direction from the first connecting position to an end portion on the opposite side from the first connecting position, and the fourth oil passage extends along the axis direction from the second connecting position to an end portion on the opposite side from the second connecting position such that a flow direction of the oil inside the third oil passage and a flow direction of the oil inside the fourth oil passage are opposite to each other in the axis direction.

2. The rotating electric machine according to claim 1, wherein:
 the first rotary member includes a first wall portion that extends in the radial direction between the first shaft and the rotor core; and
 the multiple disc clutch and the first oil passage are provided on an opposite side of the first wall portion from the second oil passage.

3. The rotating electric machine according to claim 2, wherein:

the second rotary member includes a second wall portion that extends in the radial direction between the second shaft and the multiple disc clutch; and the first rotary member includes a third wall portion that is positioned on an opposite side of the second wall portion from the first wall portion.

4. The rotating electric machine according to claim 1, wherein:

the first oil passage starts from the inside of the first shaft and the second oil passage starts from the inside of the second shaft.

5. The rotating electric machine according to claim 1, wherein:

the first oil passage starts from the inside of the second shaft and the second oil passage starts from the inside of the first shaft.

6. A rotating electric machine comprising:

a case;

a stator that is fixed to the case and includes a coil;

a first rotary member that is housed inside the case, supported by the case so as to rotate about a rotation center, and includes a rotor core and a first shaft, the rotor core facing an inner side of the stator in a radial direction with respect to the rotation center and including a permanent magnet provided such that electromagnetic force acts between the permanent magnet and the coil, and the first shaft extending along the rotation center;

a second rotary member that is housed inside the case, supported by the case so as to rotate about the rotation center, and includes a second shaft extending along the rotation center; and a multiple disc clutch that is positioned closer to the rotation center than the rotor core is, and switches a state of the first rotary member and the second rotary member between a connected state in which the first rotary member is connected to the second rotary member, and a disconnected state in which the first rotary member is disconnected from the second rotary member, wherein:

a first oil passage and a second oil passage are provided inside the case;

the first oil passage starts from one of an inside of the first shaft and an inside of the second shaft, passes through the multiple disc clutch from an inner side of the multiple disc clutch to an outer side of the multiple disc clutch in the radial direction with respect to the rotation center, and reaches an inner side of the rotor core in the radial direction;

the second oil passage starts from an other of the inside of the first shaft and the inside of the second shaft and reaches the inner side of the rotor core in the radial direction without passing through the multiple disc clutch;

the first rotary member includes a first wall portion that extends in the radial direction between the first shaft and the rotor core;

the multiple disc clutch and the first oil passage are provided on an opposite side of the first wall portion from the second oil passage;

the second oil passage includes a first section that extends along an end surface of the first wall portion, the end surface being positioned on an opposite side from the multiple disc clutch and the first oil passage; and the case includes a projecting wall portion that extends in an axis direction of the rotation center towards the end surface from an opposite side of the first wall portion from the multiple disc clutch and the first oil passage, the projecting wall portion also extending in a circumferential direction of the rotation center, and facing the end surface with a gap in the axis direction.

7. A rotating electric machine comprising:

a case;

a stator that is fixed to the case and includes a coil;

a first rotary member that is housed inside the case, supported by the case so as to rotate about a rotation center, and includes a rotor core and a first shaft, the rotor core facing an inner side of the stator in a radial direction with respect to the rotation center and including a permanent magnet provided such that electromagnetic force acts between the permanent magnet and the coil, and the first shaft extending along the rotation center;

a second rotary member that is housed inside the case, supported by the case so as to rotate about the rotation center, and includes a second shaft extending along the rotation center; and a multiple disc clutch that is positioned closer to the rotation center than the rotor core is, and switches a state of the first rotary member and the second rotary member between a connected state in which the first rotary member is connected to the second rotary members, and a disconnected state in which the first rotary member is disconnected from the second rotary member, wherein:

a first oil passage and a second oil passage are provided inside the case;

the first oil passage starts from one of an inside of the first shaft and an inside of the second shaft, passes through the multiple disc clutch from an inner side of the multiple disc clutch to an outer side of the multiple disc clutch in the radial direction with respect to the rotation center, and reaches an inner side of the rotor core in the radial direction;

the second oil passage starts from an other of the inside of the first shaft and the inside of the second shaft and reaches the inner side of the rotor core in the radial direction without passing through the multiple disc clutch;

the first rotary member includes a first wall portion that extends in the radial direction between the first shaft and the rotor core;

the multiple disc clutch and the first oil passage are provided on an opposite side of the first wall portion from the second oil passage;

the first rotary member includes a cylindrical fourth wall portion that extends in an axis direction of the rotation center between the first wall portion and the rotor core; and the second oil passage includes a first section and a ring-shaped groove, the first section extending along an end surface of the first wall portion, the end surface being positioned on an opposite side from the multiple disc clutch and the first oil passage, and the ring-shaped groove being positioned outward of the first section in the radial direction and provided in an inner peripheral surface of the fourth wall portion.

\* \* \* \* \*

UNITED STATES PATENT AND TRADEMARK OFFICE
CERTIFICATE OF CORRECTION

| | | |
|---|---|---|
| PATENT NO. | : 10,944,310 B2 | Page 1 of 1 |
| APPLICATION NO. | : 16/361559 | |
| DATED | : March 9, 2021 | |
| INVENTOR(S) | : Shigeki Ideue et al. | |

It is certified that error appears in the above-identified patent and that said Letters Patent is hereby corrected as shown below:

On the Title Page

Item (73), the Assignee's name is incorrect. Item (73) should read:
-- (73) Assignee: TOYOTA JIDOSHA KABUSHIKI KAISHA, Toyota (JP) --

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*